March 15, 1932.  L. GUSSALLI  1,849,325
VEHICLE FOR UNDULATING GROUND
Filed Jan. 6, 1930   2 Sheets-Sheet 1
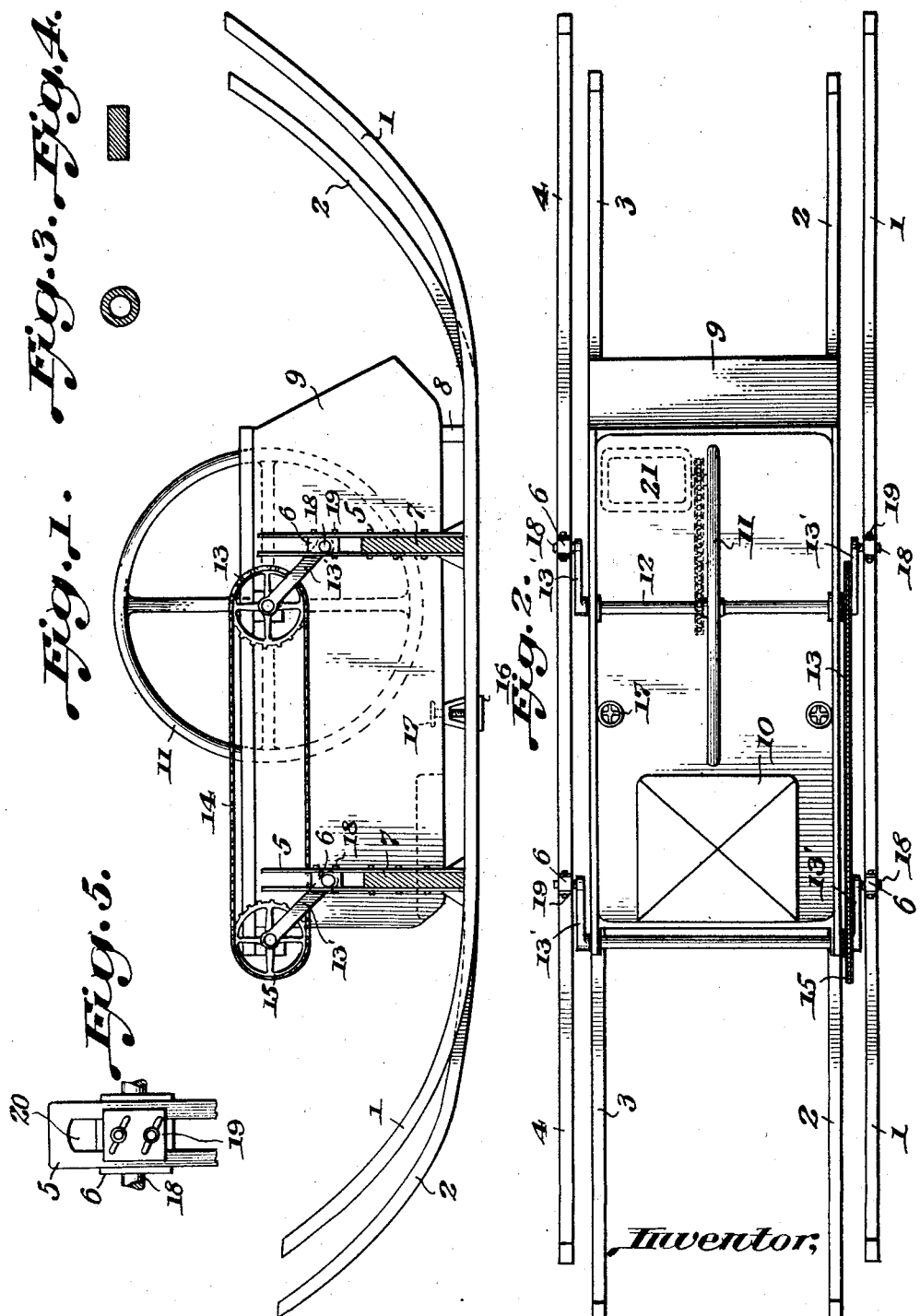

March 15, 1932.   L. GUSSALLI   1,849,325
VEHICLE FOR UNDULATING GROUND
Filed Jan. 6, 1930   2 Sheets-Sheet 2
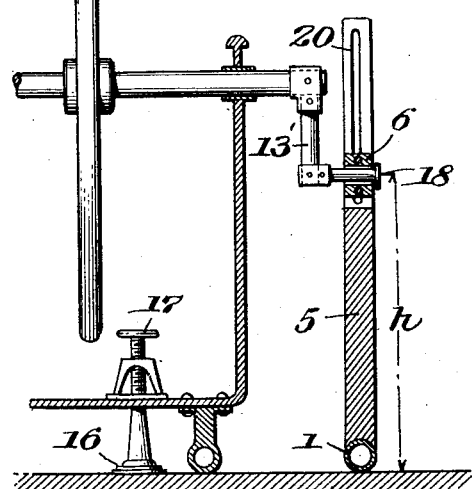
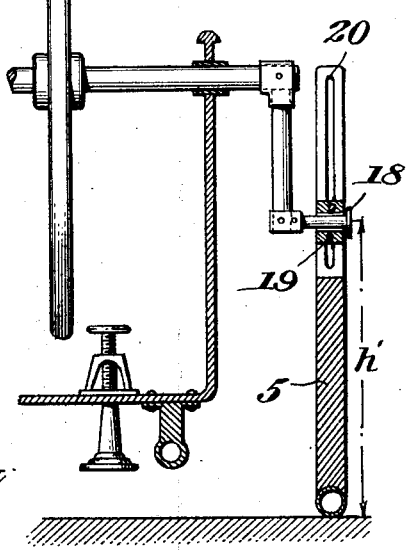
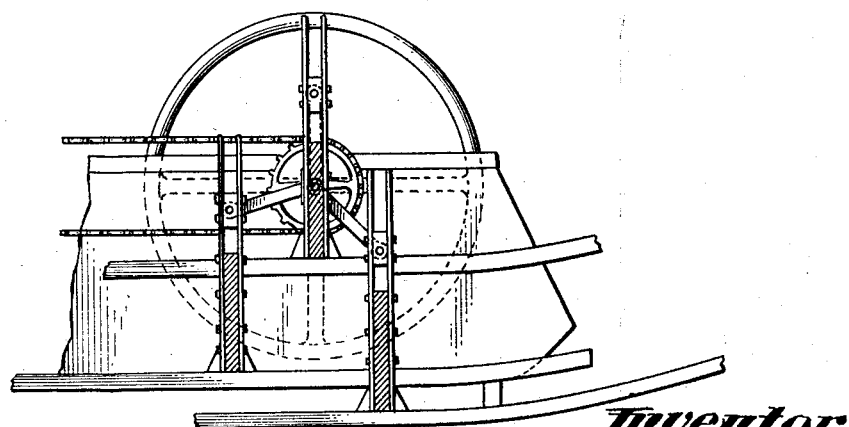
Inventor;
LUIGI GUSSALLI Patented Mar. 15, 1932

1,849,325

UNITED STATES PATENT OFFICE

LUIGI GUSSALLI, OF BRESCIA, ITALY

VEHICLE FOR UNDULATING GROUND

Application filed January 6, 1930, Serial No. 418,926, and in Belgium July 31, 1929.

The present invention has for its subject vehicles arranged in such a manner as to be capable of travelling by the action of a simple manipulative effort of the driver, over any natural ground, such as ploughed, sandy, stony, marshy or submerged land, obstructed by fallen tree trunks, furrowed by trenches, drains, cracks and the like, as also over snow and ice of ice belts.

These vehicles are essentially characterized in that their body, preferably shaped as a gondola provided with seats and operating members, is supported by at least two shoes bearing on the ground, and of which the shape and surface are arranged according to the nature of the ground to be traversed, and its forward movement is produced by at least a pair of similar shoes actuated by a member carrying out a circular movement, of which the amplitude is made proportional to the speed of forward movement desired, and set in operation by the driver of the vehicle, the height of the said shoes for forward movement above the ground being adjustable in such a manner as to enable the relation between the lifting thereof and the forward movement of the vehicle on the ground to be varied as desired at each step. They are also characterized by other secondary arrangements which may be varied as required without departing from the scope of the invention.

It is not sufficient to adopt very light structures in the construction of vehicles of this type so as to enable the propulsion over the ground to be effected simply by the muscular power of the driver. It is necessary to make the mechanisms very simple and suitable for operation with a very high mechanical efficiency. For example, vehicles equipped with endless tracks (mounted on rolling chains) can never be moved except by sufficiently powerful mechanical motors as, independently of any useful work, their mechanism consumes a considerable power.

In contrast, the mechanisms used in the construction of the vehicles forming the subject of the present invention, are arranged in such a manner that their operation, when running idly, requires only small forces. It is also possible to reduce considerably the force necessary to produce each forward movement by increasing the amplitude of the circular movements and reducing the angular amplitude of this movement whilst each forward movement is accomplished.

The accompanying drawings illustrate a method of construction, given by way of example, and of which the description will set out the nature and advantages of the present invention.

In these drawings:

Fig. 1 illustrates a side elevation;

Fig. 2 is a plan view of a vehicle according to the invention;

Figs. 3 and 4 are cross sections of a steel tube and a steel blade shoe, respectively;

Fig. 5 is a detail view of one of the slidable boxes;

Figs. 6 and 7 are partial transverse sections of the vehicle showing the slidable box in two different positions; and Fig. 8 is a partial elevational view of a vehicle with a number of shoes.

The vehicle is provided with a single seat, two supporting shoes and a pair of propelling shoes, these shoes being suitable for ploughed or simply undulating ground. By changing the shoes these vehicles may be rendered suitable for travelling over sandy, marshy, ice etc. ground. These shoes may also be provided with anti-skid devices as are usually applied to tractors and similar machines.

The shoes 1, 2, 3, 4 are of a mixtilinear shape and, in the form of construction illustrated, are formed of suitably bent simple steel tubes (Fig. 3). Each of the propelling shoes 1—4 is secured to at least two uprights, each of which 5 is provided with a ballbearing box 6 capable of being secured at an adjustable height by bolts 19 slidable in a slot 20 as shown more clearly in Fig. 5. In the case illustrated each upright is formed of two steel blades secured to the corresponding shoe, with suitable spacing, between which is interposed a wood block 7 suitable for imparting the necessary rigidity to each upright.

The supporting shoes 2, 3 are secured to feet 8 secured to the body 9, in the form of a gondola, in which is provided a seat 10 for the driver between whose legs is located a wheel 11, capable of actuation by hand, mounted in a transverse shaft 12 and driving, by chain wheels 13 and 15 and chain 14, another shaft 12' parallel to the shaft 12. At the ends of the shafts 12, 12' are mounted cranks 13' the pins 18 of which engage with ball bearing boxes 6 of the corresponding uprights.

When the bearing boxes 6 are secured at a lower level in the uprights 5 (see Fig. 6) the propelling shoes 1—4 will never skim over the ground because the distance indicated at $h$ on Fig. 6 of the lower dead point of the crank 13' from the ground is insufficient to raise the vehicle. In this case these shoes simply partake of the circular movement of the cranks 13'. By slightly raising the boxes 6 in the uprights 5 (see Fig. 7) these shoes 1—4 bear upon the ground during the lower arc of this circular movement, because now the distance indicated at $h'$ is greater than the shortest distance between the lower dead point of the crank and the ground and the vehicle should therefore be raised from the ground by an amount equal to the rise of this arc. The power to be exerted by the driver is equal to the total weight of the vehicle divided by the ratio between the diameters of the wheel 11, and the circumference described by the pin 6 of the crank 13', and the mechanical work corresponding with each step of forward movement is obtained by the product of said weight and the amount of said rise, which may be reduced as much as necessary so as to reduce the fatigue of the driver.

This arrangement therefore enables the mechanism to be so adjusted as to render propulsion possible irrespective of the load of the vehicle.

This apparatus with its essential features may be used for the transport of loads and also for cultivating operations on submerged, marshy or sandy ground, and in general it may accomplish the work generally carried out by endless track tractors.

Steering of the vehicle described is very easy. It is sufficient to provide in the body two hammer feet 16 as shown in Figs. 1, 2, 6 and 7 of which the operating heads 17 are arranged within reach of the driver, these feet being arranged on opposite sides near the supporting shoes and in a transverse plane passing through the centre of gravity of the vehicle. Simple screwing of the hammers enables the corresponding foot to be lowered which thus engages with the ground, the corresponding propelling shoe will consequently perform less work than the other which thus enables the vehicle to be turned almost within its length.

In order to accelerate the propulsion, whilst at the same time eliminating the action of the weight of the propelling shoes, it is possible to use a number of pairs of shoes actuated by multiple cranks regularly displaced relatively to one another in the circle which they describe when turning as illustrated in the partial elevational view shown in Fig. 8. It is also possible to use any suitable small motor 21 as illustrated in Fig. 2 for driving the driving wheel 11 or any other corresponding mechanical means in place of manual power.

What I claim is:

1. A vehicle suitable for travelling over any natural ground, such as ploughed, sandy, stony, marshy or submerged land, having in combination: a body, having seating means, supporting shoes fixed to the bottom of said body and adapted to bear on the ground, movable shoes connected to said body, driving means mounted on said body and adapted to alternately raise, advance and lower said movable shoes so as to advance said body, and means for steering the vehicle.

2. A vehicle suitable for travelling over any natural ground, such as ploughed, sandy, stony, marshy or submerged land, having in combination: a body shaped as a boat and having seating means, supporting shoes fixed to the bottom of said body and adapted to bear on the ground, movable shoes, driving means mounted on said body, a mechanism for actuating said movable shoes from said driving means and connecting said movable shoes to said body, and means for steering the vehicle.

3. A vehicle suitable for travelling over any natural ground, such as ploughed, sandy, stony, marshy or submerged land, having in combination: a body in the form of a boat having seating means, a pair of supporting shoes bearing on the ground and fixed to the bottom of said body, a pair of movable shoes, driving means mounted on said body, a mechanism connecting said pair of movable shoes to said body and adapted to actuate said movable shoes from said driving means, and means for steering the vehicle.

4. A vehicle suitable for travelling over any natural ground, such as ploughed, sandy, stony, marshy or submerged land, having in combination: a body in the form of a boat having seating means, a pair of arcuate tubes shaped in the form of a ski, bearing on the ground and fixed to the bottom of said body, a pair of movable arcuate tubes similarly shaped, a mechanism connecting said pair of movable arcuate tubes to said body and driving means in said body for actuating said mechanism to raise, advance and lower said movable tubes, and means for steering the vehicle.

5. A vehicle suitable for travelling over any natural ground, such as ploughed, sandy, stony, marshy or submerged land, having in combination: a body in the form of a boat having seating means, a pair of blades each of which is arcuated in the form of a ski, bearing on the ground and fixed to the bottom of said body, another pair of similarly shaped blades movable with respect to said body, driving means in said body, a mechanism actuated by said driving means and connecting said movable blades to said body, said mechanism being adapted to raise, advance and lower said movable blades with respect to said body, and means for steering the vehicle.

6. A vehicle suitable for travelling over any natural ground, such as ploughed, sandy, stony, marshy or submerged land, having in combination: a body in the form of a boat having seating means, driving means on said body, supporting shoes fixed to the bottom of said body, at least one pair of movable shoes, a pair at least of uprights for each movable shoe, bearing boxes slidable along said uprights and means for securing said boxes on said uprights at any desired height, a plurality of crank shafts journalled on said body and having at their ends a plurality of cranks the pins of which are journaled in said bearing boxes, a mechanism for actuating said shafts by said driving means, and means for steering the vehicle.

7. A vehicle suitable for travelling over any natural ground, such as ploughed, sandy, stony, marshy or submerged land, having in combination: a body in the form of a boat having seating means, a pair of arcuated tubes each of which is shaped as a ski, bearing on the ground and fixed to the bottom of said body, a pair of movable arcuated similarly shaped tubes, a pair of uprights fixed on each of said movable tubes, bearing boxes slidable along said uprights, bolts for fixing said boxes on said uprights at any desired height, cranks pivoted by their crank pins in said bearing boxes, two shafts journaled on said body and carrying at their ends said cranks, driving means for rotating said shafts, and means for steering the vehicle.

8. A vehicle suitable for travelling over any natural ground, such as ploughed, sandy, stony, marshy or submerged land, having in combination: a body in the form of a boat having seating means, a pair of blades each of which is arcuated as a ski, bearing on the ground and fixed to the bottom of said body, another pair of similarly shaped blades movable with respect to said body, a pair of uprights fixed on each of said movable blades bearing boxes slidable along said uprights, bolts for fixing said boxes on said uprights at any desired height, cranks pivoted by their crank pins in said bearing boxes, two shafts journaled on said body and carrying at their ends said cranks, driving means for rotating said shafts, and means for steering the vehicle.

9. A vehicle suitable for travelling over any natural ground, such as ploughed, sandy, stony, marshy or submerged land, having in combination: a body in the form of a boat having seating means, a pair of arcuated tubes each shaped as a ski, bearing on the ground and fixed to the bottom of said body, a pair of movable arcuated tubes similarly shaped, a pair of uprights fixed on each of said movable tubes, bearing boxes slidable along said uprights, bolts for fixing said boxes on said uprights at any desired height, cranks pivoted by their crank pins in said bearing boxes, two shafts journaled on said body and carrying at their ends said cranks, a rotatable member keyed on each of said shafts, endless members positioned about said rotatable members and connecting said shafts one with another, a fly wheel keyed on one of said shafts and adapted for manual operation, and means for steering the vehicle.

10. A vehicle suitable for travelling over any natural ground, such as ploughed, sandy, stony, marshy or submerged land, having in combination: a body in the form of a boat having seating means, a pair of blades each arcuated as a ski, bearing on the ground and fixed to the bottom of said body, another pair of similarly shaped blades movable with respect to said body, a pair of uprights fixed on each of said movable blades, bearing boxes slidable along said uprights, bolts for fixing said boxes on said uprights at any desired height, cranks pivoted by their crank pins in said bearing boxes, two shafts journaled on said body and carrying at their ends said cranks, a rotatable member keyed on each of said shafts, endless members positioned about said rotatable members and connecting said shafts for rotation one with another, a fly wheel keyed on one of said shafts for manual operation, and means for steering the vehicle.

11. A vehicle suitable for travelling over any natural ground, such as ploughed, sandy, stony, marshy or submerged land, having in combination: a body having seating means, supporting shoes fixed to the bottom of said body and adapted to bear on the ground, movable shoes connected to said body, driving means mounted on said body and adapted to alternately raise, advance and lower said movable shoes so as to advance said body, two hammer feet arranged on said body in proximity of said seating means and at the opposite sides near said supporting shoes, in a transverse plane passing through the center of gravity of the vehicle, for projection and withdrawal to provide for the steering of the vehicle.

12. A vehicle suitable for travelling over any natural ground, such as ploughed, sandy, stony, marshy or submerged land, having in combination: a body shaped as a boat and having seating means, supporting shoes fixed to the bottom of said body and adapted to bear on the ground, movable shoes, driving means mounted on said body, a mechanism for actuating said movable shoes from said driving means and connecting said movable shoes to said body, two hammer feet arranged on said body in proximity of said seating means and at the opposite sides near said supporting shoes, in a transverse plane passing through the center of gravity of the vehicle, and threaded shafts supporting said feet for projection and withdrawal thereof for steering the vehicle.

13. A vehicle suitable for travelling over any natural ground, such as ploughed, sandy, stony, marshy or submerged land, having in combination: a body in the form of a boat having seating means, a pair of arcuated tubes each shaped as a ski, bearing on the ground and fixed to the bottom of said body, a pair of movable arcuated tubes similarly shaped, a mechanism connecting said pair of movable arcuated tubes to said body and driving means in said body for actuating said mechanism to raise, advance and lower said movable tubes, two hammer feet arranged on said body in proximity of said seating means and at the opposite sides near supporting tubes, in a transverse plane passing through the center of gravity of the vehicle for projection and withdrawal to provide for the steering of the vehicle.

14. A vehicle suitable for travelling over any natural ground, such as ploughed, sandy, stony, marshy or submerged land, having in combination: a body in the form of a boat having seating means, a pair of blades each arcuated as a ski, bearing on the ground and fixed to the bottom of said body, another pair of similarly shaped blades movable with respect to said body, driving means in said body, a mechanism connecting said movable blades to said driving means and adapted to raise, advance and lower said movable blades with respect to said body, two hammer feet arranged on said body in proximity of said seating means and at the opposite sides near said supporting blades, in a transverse plane passing through the center of gravity of the vehicle, for projection and withdrawal to provide for the steering of the vehicle.

15. A vehicle suitable for travelling over any natural ground, such as ploughed, sandy, stony, marshy or submerged land, having in combination: a body in the form of a boat having seating means, driving means on said body, supporting shoes fixed to the bottom of said body, at least one pair of movable shoes, a pair at least of uprights for each movable shoe, bearing boxes slidable along said uprights, means for securing said boxes on said uprights at any desired height, a number of crank shafts journaled on said body and having at their ends a number of cranks the pins of which are journaled in said bearing boxes, a mechanism for actuating said shafts by said driving means, two hammer feet arranged on said body in the proximity of said seating means and at the opposite sides near said supporting shoes, in a transverse plane passing through the center of gravity of the vehicle, for projection and withdrawal to provide for the steering of the vehicle.

16. A vehicle suitable for travelling over any natural ground, such as ploughed, sandy, stony, marshy or submerged land, having in combination: a body in the form of a boat having seating means, a pair of arcuated tubes each shaped as a ski, bearing on the ground and fixed to the bottom of said body, a pair of movable arcuated tubes similarly shaped, a pair of uprights fixed on each of said movable tubes, bearing boxes slidable along said uprights, bolts for fixing said boxes on said uprights at any desired height, cranks pivoted by their crank pins in said bearing boxes, two shafts journaled on said body and carrying at their ends said cranks, a rotatable member keyed on each of said shafts, endless members running over said rotatable members to connect said shafts one with another, a fly wheel keyed on one of said shafts for manual operation, two hammer feet arranged on said body in proximity to said seating means and at the opposite sides near said supporting tubes, in a transverse plane passing through the center of gravity of the vehicle, for projection and withdrawal to provide for the steering of the vehicle.

17. A vehicle suitable for travelling over any natural ground, such as ploughed, sandy, stony, marshy or submerged land, having in combination: a body shaped as a gondola having seating means, a pair of blades arcuated as a ski, bearing on the ground and fixed to the bottom of said body, another pair of similarly shaped blades movable with respect to said body, a pair of uprights fixed on each of said movable blades, gearing boxes slidable along said uprights, bolts for fixing said boxes on said uprights at any desired height, cranks pivoted by their crank pins in said bearing boxes, two shafts journaled on said body and carrying at their ends said cranks, a rotatable member keyed on each of said shafts, endless members running over said rotatable members to connect said shafts one with another, a fly wheel keyed on one of said shafts for manual operation, two hammer feet arranged on said body in proximity of said seating means and at the opposite sides near said supporting blades, in a transverse plane passing through the center of gravity of the vehicle, for projection and withdrawal to provide for the steering of the vehicle.

In testimony whereof I affix my signature.

LUIGI GUSSALLI.